May 19, 1970     W. A. MARRISON     3,513,402

HIGH ENERGY LASER

Filed March 6, 1968     4 Sheets-Sheet 1

Warren A. Marrison
INVENTOR.

BY *Edward Dugas*

ATTORNEY

May 19, 1970  W. A. MARRISON  3,513,402
HIGH ENERGY LASER

Filed March 6, 1968  4 Sheets-Sheet 2

Warren A. Marrison
INVENTOR.

BY *Edward Regas*
ATTORNEY

May 19, 1970     W. A. MARRISON     3,513,402
HIGH ENERGY LASER

Filed March 6, 1968     4 Sheets-Sheet 3

Warren A. Marrison
INVENTOR.

BY *Edward Dugas*

ATTORNEY

United States Patent Office 3,513,402
Patented May 19, 1970

3,513,402
HIGH ENERGY LASER
Warren A. Marrison, Palos Verdes Estates, Calif., assignor to TRW Inc., Redondo Beach, Calif., a corporation of Ohio
Filed Mar. 6, 1968, Ser. No. 711,042
Int. Cl. H01s 3/00
U.S. Cl. 330—4.3
9 Claims

ABSTRACT OF THE DISCLOSURE

The device of this invention is directed to a laser system wherein an auxiliary tandem laser is used to increase the energy and power output of the system. The invention is specifically directed toward increasing the diameter of the auxiliary laser, greater than that of the primary laser. In one embodiment, this is accomplished by forming the auxiliary laser material in the shape of a truncated cone, with the truncated end having a diameter substantially equal to the diameter of the primary laser material. A negative lens is interposed between the auxiliary laser and the primary laser to diverge the beam from the primary laser at an angle corresponding to the angle of divergence of the truncated cone.

BACKGROUND OF THE INVVENTION

This invention relates generally to high energy tandem laser systems and, more particularly, to a configuration for increasing the energy and power levels available from these systems.

Laser amplifiers are well known in the prior art, for example, in U.S. Pat. No. 3,292,102 entitled, "Pulsed Optical Beam Generator" by F. T. Byrne, there is shown a plurality of aligned laser amplifier sections which operate in conjunction to increase the energy level output of the laser system. Each of the amplifier sections in that patent is identical to the preceding section. The selection of a particular mode, to be transmitted to succeeding sections, provides at the final section a concentrated energy beam containing that particular selected mode. Another example of laser amplifiers is given in U.S. Pat No. 3,333,206 entitled, "Stable Traveling Wave Amplifier for Pulsed Lasers" by G. Bret et al. In that patent, a plurality of laser elements are cascaded to form a sequential amplifying system. The system comprises $n$ units of active laser material such that each unit of laser material is pumped at the instant the pulsed beam of light energy is within the laser material. The beam that passes through the laser material is thereby increased in intensity to effectively provide the entire system with a degree of gain. Each of the above-referenced cases has used an auxiliary laser or amplifying laser that has been constructed with substantially the same cross section and shape as the primary laser. Hence, the output has been limited in some degree by the diameter of the primary laser material. It would, therefore, be highly desirable to have an amplifier system wherein the output level could be increased above the presently available with the known state-of-the-art.

SUMMARY OF THE INVENTION

In a preferred embodiment fo this invention, the auxiliary laser amplifier is positioned in axial symmetry with the primary laser and is shaped in the form of a truncated cone. The truncated end of the cone-shaped laser material is positioned to receive energy from the primary laser. The diameter of the cone at the truncated end is approximately that of the primary laser. The auxiliary laser material then expands outward to provide an increasing cross-sectional area which can store and control a greater amount of energy. Pumping means are provided for both the primary and the auxiliary laser elements. The pumping means for the auxiliary laser is formed such that at the larger end there is a higher concentration of pumping energy than at the narrower end. With this configuration, if the effective exit diameter of the cone were double the entrance diameter, the output energy of the amplifying system will be approximately four times that obtainable with an amplifying rod having the same diameter as the primary laser.

Accordingly, it is an object of the present invention to provide and improve laser amplifying systems.

It is a further object of the present invention to provide a laser amplifying system having output energy levels heretofore unobtainable with such amplifying systems.

It is another object of the present invention to provide a laser amplifier wherein the cross-sectional area of the auxiliary laser is greater than the cross-sectional area of the primary laser.

The aforementioned and other objects of the present invention will become more apparent when taken in conjunction with the following description and drawings, throughout which like characters indicate like parts, and which drawings form a part of this application.

DESCRIPTION OF THE PREFERRED EMBODIMENTS

Figure 1:
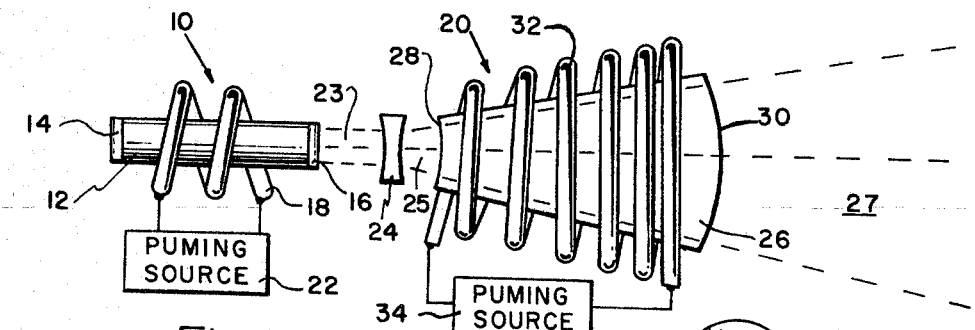
FIG. 1 illustrates in block diagram form one embodiment of the present invention utilizing a truncated cone shape for the auxiliary laser material.

Referring to FIG. 1, a primary laser comprised of laserable material 12 having end reflectors 14 and 16 forming an optical cavity therewith provides an output beam 23 when pumped by an optical pump means comprised of a helical coil gas-filled discharge lamp 18 and a pumping power source 22. The output beam of coherent light 23 is directed into a negative lens 24 which diverges the beam into a beam 25. The divergent beam 25 is directed to an auxiliary laser 20 comprised of a laserable material 26, which is shaped to form a truncated cone. The divergence angle of the cone matches that of the beam 25. By curving the ends 28 and 30 of the laser material 26, the path length seen by each ray of the diverging beam 25, can be made equal for all angles, in which case the light enters and leaves the laserable material 26 normal to the surface 30. Since, in the progress of light through the laserable material 26, increasingly larger cross sections of laser material are encountered the total energy in the laser beam can be greatly enhanced without abnormally increasing the stored energy density in the material of the amplifier. Thus, if the effective exit diameter of the cone were double the entrance diameter, an output energy of approximately four times that obtainable with a cylindrical amplifier rod can be achieved. A natural limitation on the effectiveness of this device is in the means for optically pumping the increasing cross section of the amplifier cone. A means for solving this particular problem is shown with a spiral xenon lamp 32 with convolutions more closely spaced toward the larger end 30, than at the narrower end 28. The non-linear spacing of the pumping lamp provides increased pumping energies at the increased laser areas. A pumping power source 34 provides power to the pumping lamp 32.

Figure 2:
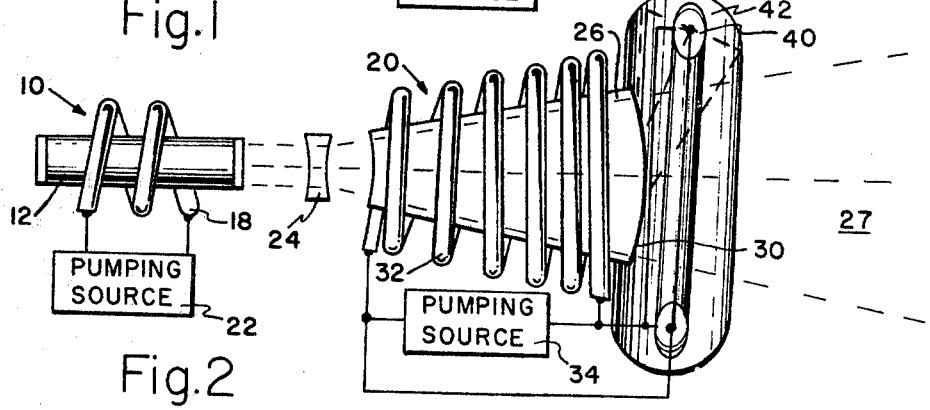
FIG. 2 illustrates in block diagram form a modification of the embodiment illustrated in FIG. 1 utilizing additional pumping means on the auxiliary laser material.

Referring now to FIG. 2 wherein is shown a modification of the apparatus in FIG. 1. Additional optical pumping may be desired and can be achieved through the exit aperture of the auxiliary laser 20 by utilizing a circular ring-shaped xenon flash lamp 40 in conjunction with a ring-shaped reflector 42 positioned to reflect the light from the xenon lamp 40 onto the surface 30 of the laserable material 26. The pumping source 34 is connected both to the xenon lamp 32 and the lamp 40 so as to pulse both lamps 32 and 40 at the same time. The output from the embodiments of FIG. 1 and FIG. 2 is a diverging beam 27, conically shaped around the central axes of the primary and auxiliary laser elements.

Figure 3:
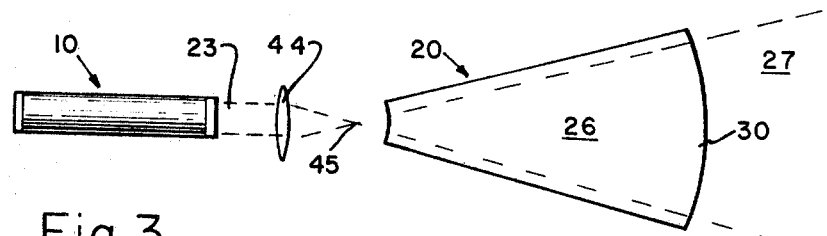
FIG. 3 illustrates in block diagram form a second embodiment of the invention utilizing a positive lens positioned between the primary and auxiliary laser materials.

Various modifications of this basic concept are disclosed in the following figures. FIG. 3, for example, illustrates a positive lens 44 substituted for the negative lens 24 of FIGS. 1 and 2. Utilization of the positive lens causes the output beam 23 from the primary laser 10 to focus at a point 45 located before the entrance to the laserable material 26. The beam, once it is focused at point 45, diverges conically from that point in a similar fashion as from the lens 24. The conic section of the laser amplifier 20 is then designed such that the divergence angle of the cone 26 corresponds to the divergence angle from the focus point 45. An advantage to be obtained in utilizing this embodiment is that the light entering the amplifier laser can have a higher initial density. Another is that, since the entrance end of the amplifier can be made substantially smaller than in the embodiments shown in FIGS. 1 and 2, the ratio of output aperture to input aperture can be increased, thereby providing a larger increase in the amplification. The means for pumping the primary laser 10 and the amplifying laser 20 are not shown in this and following figures for purposes of simplicity.

Figure 4:
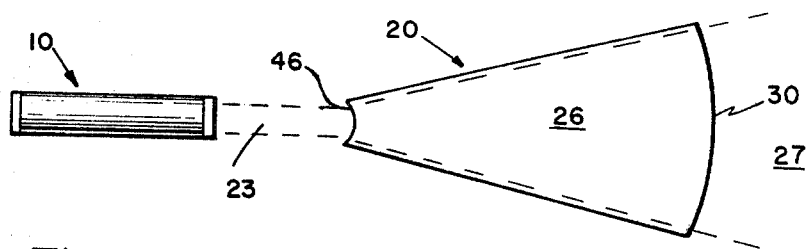
FIG. 4 illustrates in block diagram form a third embodiment of the invention wherein the end surfaces of the truncated cone form lens elements.

In FIG. 4, the entrance curvature 46 of the laser amplifier cone material 26 is increased so as to provide the negative lens element required to produce a divergent beam. In this particular embodiment, the output 23 from the primary laser can be directed directly to the amplifier element 20 without the need for a separate negative lens as was used in FIGS. 1 and 2. The advantage in using this arrangement is principally that one optical element is eliminated with a resulting saving in light (reduced reflection losses) and a possible improvement in optics since fewer ground surfaces are involved.

Figure 5:
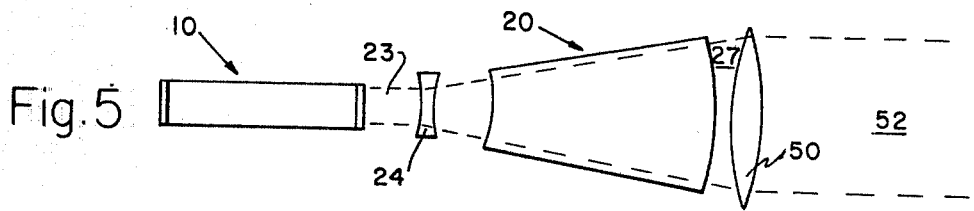
FIG. 5 illustrates in block diagram form a fourth embodiment of the invention using discrete lens elements to form a collimated output beam.

In FIG. 5, the diverging output beam 27 is directed to a collimating lens 50 which operates upon the diverging beam 20 to form the collimated beam 52. If the collimating lens is positioned next to the exit aperture of the amplifier laser 20, the beam 52 will have a width substantially corresponding to the width of the exit aperture and the diffraction limitation will be approximately that imposed by the laser aperture. By positioning the collimating lens 50 further away from the exit aperture and by increasing the diameter of the collimating lens, the width of the collimated beam 52 may be substantially increased. The diffraction limitation in this particular case will be reduced because of the larger effective aperture area.

Figure 6:
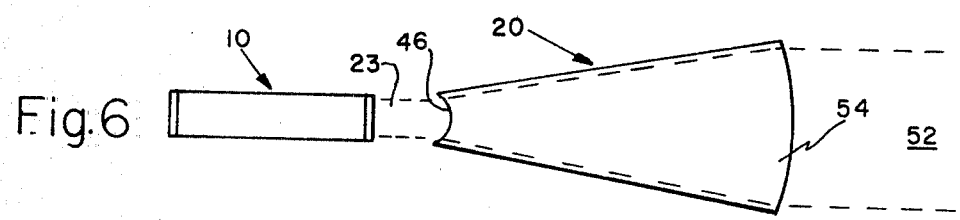
FIG. 6 illustrates in block diagram form a fifth embodiment of the invention incorporating a collimating lens in the material of the auxiliary amplifier.
Figure 7:
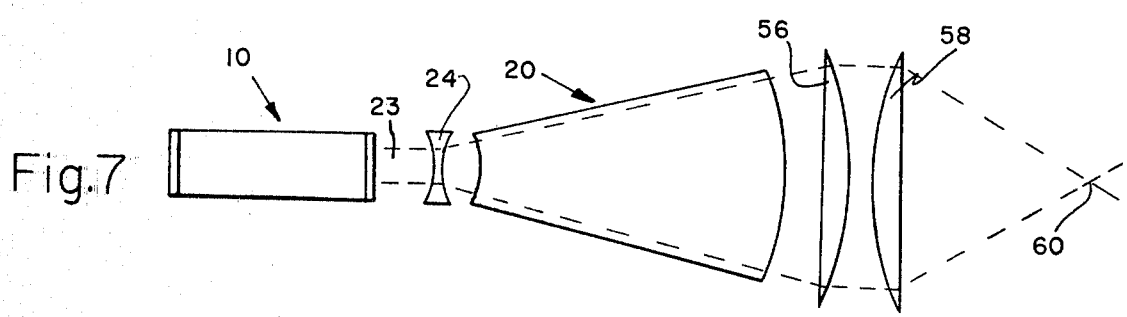
FIG. 7 illustrates in block form a sixth embodiment of the invention utilizing a set of lenses positioned to focus the output from the laser amplifier into a high energy beam.

In the embodiment of FIG. 6, the negative lens surface of FIG. 4 is combined with the output aperture 54 shaped to form a composite positive lens to provide a collimated output beam 52 without the use of the auxiliary lens 50. In those particular applications where a concentration of energy is needed, the embodiment of FIG. 7 may be used. In this embodiment a group of lenses 56 and 58 collimate the diverging beam from the laser amplifier 20 and then converge the beam to focus at a spot 60. A target or refractory material to be analyzed may be positioned at this point and illuminated with the high energy beam thus created.

Figure 8:
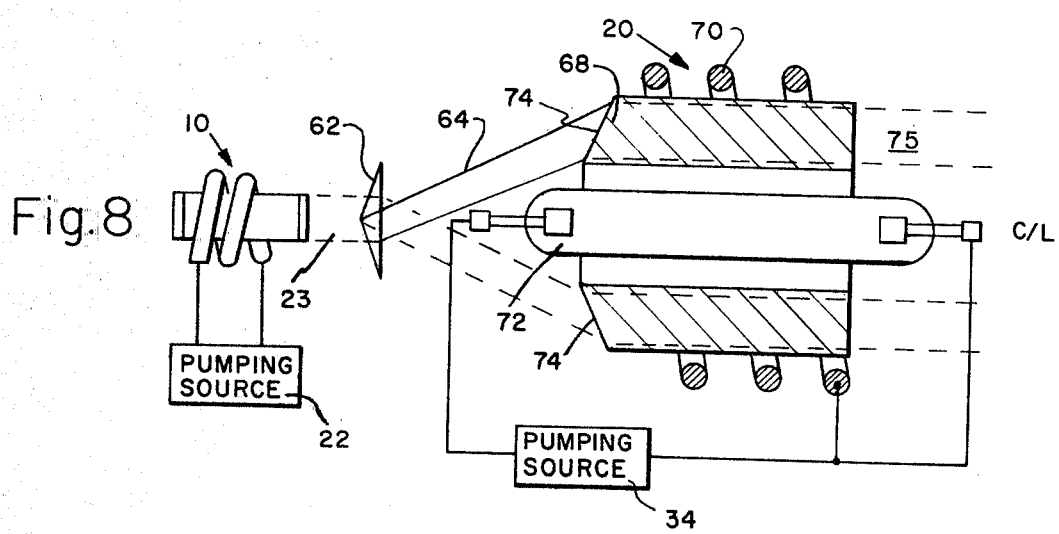
FIG. 8 illustrates in a partially sectioned schematic view a seventh embodiment of the invention.
Figure 9:
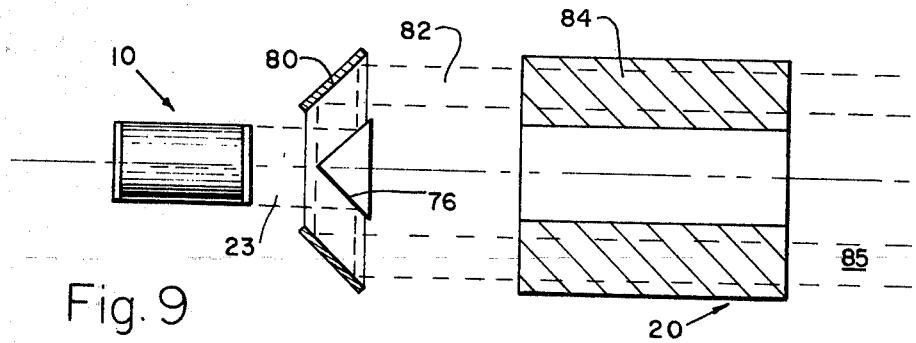
FIG. 9 illustrates in a partially sectioned schematic view an eighth embodiment of the invention.

A different species of the invention is illustrated in FIG. 8 wherein a high power laser amplifier configuration is used which may be more convenient to construct and easier to pump than the ones disclosed in FIGS. 1 through 7. As before, the purpose of the invention is to provide a laser amplifier having an exit aperture a number of times larger than that of the exciting (primary) laser, and having a larger volume of laser material for energy storage. In this particular embodiment, the primary laser is identical to the preceding described primary lasers and provides an output beam 23. Positioned in the path of the output beam is a circular prism 62 which deflects the light from one side of the center line to a portion of the amplifier on the opposite side of the center line as illustrated by the conical beam 64. The beam 64 has a circular symmetry about the central axis of the primary and amplifying laser. The amplifying laser 20 is formed with a hollow cylindrical lasing material 68 having a lasing cross section substantially larger than the diameter of the lasing material of the primary laser 10. The entrance surface 74 of the laser amplifying material 68 is beveled so as to redirect the diverging funnel-shaped beam 64 axially through the walls of the lasing material 68 thereby providing a cylindrical output beam 75 which, loosely speaking, is hollow in the center. Various pumping means may be used to pump the auxiliary laser; one such means is that shown comprised of a standard xenon coil 70 which is electrically connected to a pumping source 34 and, to increase the pumping energy level, a second xenon lamp 72 is axially disposed in the hollow center of the lasing material 68 and in turn it is connected to the pumping source 34. Any loss of light by reflection from the prism surface of this embodiment can be reduced by the use of suitable anti-reflection dielectric coatings which are well known to those persons skilled in the art. An alternative method for producing the required beam deviation is shown in FIG. 9. In that figure, the output beam 23 from the primary laser is directed to a conical carrier 76 which redirects the beam axially therefrom, which is redirected parallel to the primary laser's beam 23 by means of a hollow conical reflector 80 which is symmetrical positioned with respect to the conical mirror 76. The redirected beam 82, which is shaped as a rather thick walled hollow cylinder, is directed to the amplifying laser 20 which is comprised of the laserable material 84 shaped as a right circular hollow cylinder having a thick wall portion, slightly greater in thickness than the width of beam 82. The output beam 85 will have a similar dimension with respect to the input beam 82.

Figure 10:
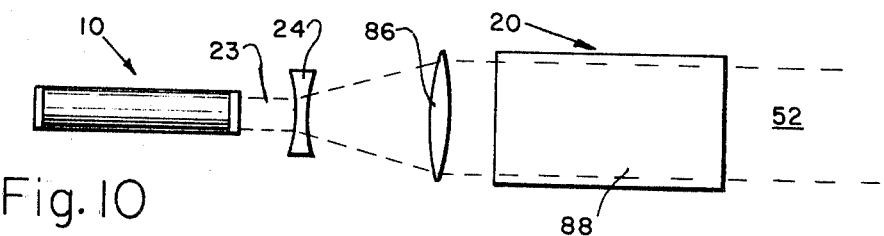
FIG. 10 illustrates in block diagram form a ninth embodiment of the invention wherein the auxiliary amplifier material is a right circular cylinder in shape.
Figure 11:
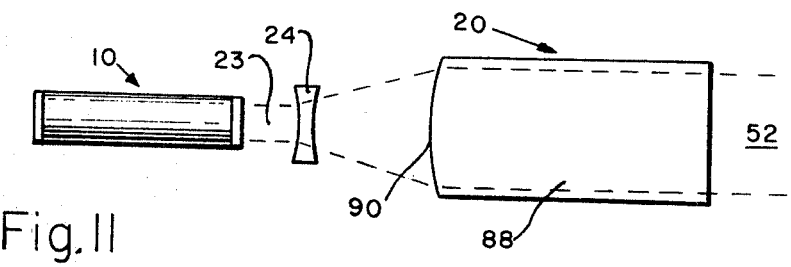
FIG. 11 illustrates in block diagram form a tenth embodiment of the invention wherein a positive lens is used integral with the right circular cylinder of the embodiment of FIG. 10.

In FIG. 10, the output beam 23 of the primary laser 10 is directed to a negative lens element 24 which diverges the beam and then to a collimating lens 86 which collimates the beam in a width substantially larger than the width of the primary beam 23. This collimated beam is then directed to a right circular cylinder shaped laser material 88 which forms the auxiliary laser element 20. The output from the auxiliary laser 20 is the collimated beam 52. As in previous disclosed embodiments, it may also be feasible to integrate the collimating lens 86 into the body of the lasing material 88, as is shown in FIG. 11, by forming the input aperture on the laser amplifier 20 as a collimating lens 90.

Figure 12:
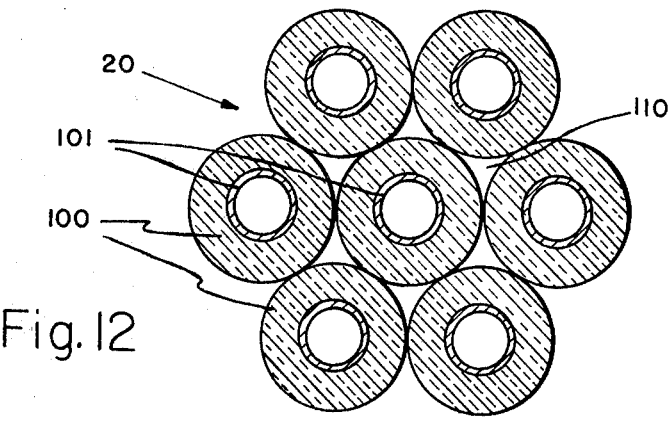
FIG. 12 illustrates in sectional view an eleventh embodiment of the invention utilizing a plurality of circular hollow laser elements positioned in a circular array.
Figure 13:
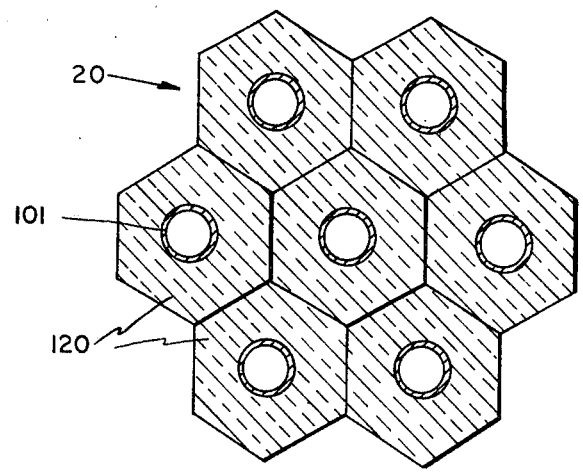
FIG. 13 illustrates in a sectioned view a twelfth embodiment of the invention utilizing a plurality of hexagonal amplifier laser elements positioned in a compact array.

In FIG. 12 there is shown a cross section of another embodiment of the auxiliary laser's active material. In this embodiment seven identical tubular lasers, which may be made from neodymium-doped glass or other suitable lasing material, are arranged in a circular array. Each element of the array can be separately pumped by a straight discharge lamp 101 located in the bore of the lasing material. Each of the discharge lamps may be triggered simultaneosly, in parallel, in series, or in combination. If seven circular tubes are mounted, as shown in FIG. 12, with the bore in each tube equal to one-third of the diameter of the outside diameter of the lasing elements, the effective lasing cross section of the seven tubes is 69% of the area of the complete circle that encloses the array. The spaces 110 between the circular elements can be used as circulating passageways for cooling elements in a system where repetitive high energy pulses are needed. If the cooling is not necessary, as would be the case with single shot devices, more effective use of the space can be obtained by nesting hexagonal tubes as shown in FIG. 13. The hexagonal tubes 120 each have a central bore 101 which comprises the discharge passageway for pumping the laserable element. In this particular embodiment, the effective lasing cross section is 77%.

Figure 14:
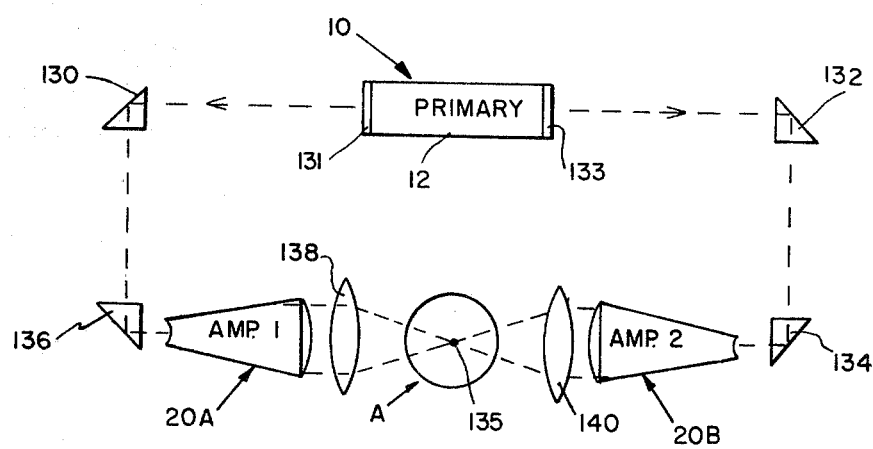
FIG. 14 illustrates in block diagram form an amplifier system utilizing the principles of the present invention.

Referring now to FIG. 14, the primary laser 10 in this configuration employs the output from both ends of the primary laser to excite two amplifiers 20a and 20b simultaneously. In this embodiment, the reflectors 131 and 133 which bound the optical cavity for the laser material 12 are both partially transparent. The output from each end of the primary laser 10 is directed to a set of roof prisms 130 and 132. The roof prisms direct the output beams downward to a second set of roof prisms 136 and 134. Roof prism 136 redirects the output beam through the amplifier 20a, the output of which is a collimated beam directed to the focusing lens 138 which focuses this collimated output beam to the point 135. The roof prism 134 directs the output beam from the primary laser to the laser amplifier 20b, the output of which is a collimated beam directed to the focusing lens 140 which focuses the collimated beam again to the point 135. This double amplifying system concentrates a very high level of energy at the focused point 135. The point 135 may, for example, be located within an evacuated chamber A. A target formed of a thin layer of material, such as lithum deuteride could be positioned at this point and bombarded from both sides simultaneously by the high energy laser beams.

While there has been shown what is considered to be the preferred embodiments of the invention, it will be manifest that many changes and modifications may be made therein without departing from the essential spirit of the invention. It is intended, therefore, in the annexed claims, to cover all such changes and modifications as may fall within the true scope of this invention.

What is claimed is:

1. A laser system for producing a high energy beam of radiation comprising in combination:
   a primary laser;
   means for pumping said primary laser producing an output beam;
   means for diverging said output beam into a beam of annular cross section;
   amplifier means positioned to receive said diverged beam, said means comprised of laserable material; and
   means for pumping said amplifier means to provide a high energy output beam.

2. The invention according to claim 1 wherein said laserable material is shaped as a hollow cylinder having thick wall portions to receive said diverged beam.

3. The invention according to claim 2 wherein said hollow cylinder has a beveled end surface to redirect said diverging beam axially through the wall portions of said cylinder.

4. The invention according to claim 2 wherein said pumping means is comprised of a light source positioned axially within said hollow cylinder, and a light source wound around the outer surface of said cylinder.

5. A laser system for producing a high-energy, coherent light beam comprising:
   (a) a primary laser for generating a coherent light beam;
   (b) means for pumping said primary laser to develop said light beam;
   (c) an auxiliary laser for amplifying said light beam and including a laserable material, said laserable material comprising an array of hexagon-shaped elements, each having a hollow center along the axis thereof; and
   (d) means for pumping said hexagon-shaped elements to provide a high-energy amplified light beam.

6. A laser system for producing a high-energy, coherent light beam comprising:
   (a) a primary laser having a main axis for developing coherent light beams in opposite directions along said main axis;
   (b) means for pumping said primary laser to develop the oppositely directed light beams;
   (c) means for directing said light beams along predetermined paths, each forming a predetermined angle with said main axis;
   (d) means positioned in said paths for diverging each of said light beams;
   (e) auxiliary laser means positioned to receive said divergent light beams for amplifying said light beam and including a laserable material; and
   (f) means for pumping said auxiliary laser means to provide a high-energy light output beam.

7. A laser system as defined in claim 6 wherein said auxiliary laser means includes two separate lasers, each including a laserable material in the shape of a truncated cone, said truncated cones being spaced apart along a common axis, and means for focusing the light beams from said truncated material to a common point.

8. A laser system for producing a high-energy, coherent light beam comprising:
   (a) a primary laser oscillator for generating a beam of coherent light;

(b) means for pumping said primary laser to develop said light beam;

(c) an auxiliary laser amplifier positioned to receive said light beam from said primary laser, said auxiliary laser including a laserable material shaped substantially as a truncated cone, the truncated end of said cone being positioned adjacent primary laser; and (d) means for pumping said auxiliary laser to provide an output light beam of higher energy than that developed by said primary laser, said last-named means consisting of a flash lamp wound about said auxiliary laser and having a spacing between turns which increases as the cross-section of said truncated cone decreases.

9. A laser system as defined in claim 8 wherein annular pumping means is additionally provided for reflecting energy onto the large cross-sectional end of said truncated cone.

References Cited

UNITED STATES PATENTS

| | | | |
|---|---|---|---|
| 3,312,905 | 4/1967 | Lewis | 330—4.3 |
| 3,369,192 | 2/1968 | Koester | 331—94.5 |
| 3,414,836 | 12/1968 | Clark et al. | 331—94.5 |

RODNEY D. BENNETT, Primary Examiner

D. C. KAUFMAN, Assistant Examiner

U.S. Cl. X.R.

331—94.5